(12) United States Patent
Russell et al.

(10) Patent No.: US 8,550,499 B2
(45) Date of Patent: Oct. 8, 2013

(54) PYROTECHNIC LAP BELT PRETENSIONER WITH SLIDER BAR FUNCTION

(75) Inventors: Jeff A. Russell, Warren, MI (US);
Timothy J. Cahill, Dryden, MI (US);
Regis Dutell, Pinneberg (DE)

(73) Assignee: Autoliv ASP, Inc., Ogden, UT (US)

( * ) Notice: Subject to any disclaimer, the term of this patent is extended or adjusted under 35 U.S.C. 154(b) by 131 days.

(21) Appl. No.: 12/964,293

(22) Filed: Dec. 9, 2010

(65) Prior Publication Data

US 2012/0146385 A1  Jun. 14, 2012

(51) Int. Cl.
*B60R 22/46* (2006.01)

(52) U.S. Cl.
USPC .................. 280/806; 280/801.2; 280/807

(58) Field of Classification Search
USPC ............ 280/801.2, 804, 805, 806, 807
See application file for complete search history.

(56) References Cited

U.S. PATENT DOCUMENTS

| | | | |
|---|---|---|---|
| 3,901,531 A * | 8/1975 | Prochazka | 297/470 |
| 4,239,260 A * | 12/1980 | Hollowell | 280/806 |
| 4,886,296 A * | 12/1989 | Brodmann | 280/805 |
| 4,900,060 A * | 2/1990 | Yamamoto et al. | 280/804 |
| 4,915,414 A | 4/1990 | Weman | |
| 4,917,210 A * | 4/1990 | Danicek et al. | 180/268 |
| 5,292,181 A * | 3/1994 | Dybro | 297/468 |
| 5,294,150 A * | 3/1994 | Steffens, Jr. | 280/801.2 |
| 5,299,830 A | 4/1994 | Hanna et al. | |
| 5,313,690 A | 5/1994 | Hiramatsu et al. | |
| 5,991,440 A | 11/1999 | Matsubayashi et al. | |
| 6,068,664 A | 5/2000 | Meyer et al. | |
| 6,113,145 A | 9/2000 | Evans | |
| 6,237,958 B1 | 5/2001 | Patrickson | |
| 6,340,176 B1 * | 1/2002 | Webber et al. | 280/806 |
| 6,513,880 B2 * | 2/2003 | Yamaguchi et al. | 297/468 |
| 6,698,795 B2 | 3/2004 | Enomoto et al. | |
| 6,824,167 B2 | 11/2004 | Nishimoto et al. | |
| 6,902,195 B2 * | 6/2005 | Ball et al. | 280/806 |
| 6,913,288 B2 * | 7/2005 | Schulz et al. | 280/805 |
| 7,118,133 B2 * | 10/2006 | Bell et al. | 280/806 |
| 7,137,650 B2 | 11/2006 | Bell et al. | |
| 7,188,868 B2 * | 3/2007 | Yamaguchi | 280/806 |
| 7,338,083 B2 * | 3/2008 | Sakata | 280/806 |
| 7,618,064 B2 | 11/2009 | Kuroki | |
| 7,823,924 B2 * | 11/2010 | Dewey et al. | 280/806 |
| 2006/0038391 A1 * | 2/2006 | Bell et al. | 280/807 |
| 2007/0029774 A1 | 2/2007 | Kuroki | |
| 2007/0069515 A1 * | 3/2007 | Sakata | 280/806 |
| 2009/0315312 A1 * | 12/2009 | Dewey et al. | 280/806 |
| 2011/0012418 A1 * | 1/2011 | Mages | 297/480 |

* cited by examiner

*Primary Examiner* — Drew Brown
*Assistant Examiner* — Barry Gooden, Jr.
(74) *Attorney, Agent, or Firm* — Brinks Hofer Gilson & Lione

(57) ABSTRACT

A slider bar for use with two-door style motor vehicles for anchoring the lap belt for front seat occupants. The slider bar allows the lower anchorage point of the lap belt to freely move in the fore and aft direction to enhance rear seat compartment passenger ingress and egress. The slider bar further incorporates a pyrotechnic lap pretensioner (PLP) function for exerting pretensioning motion of the lap belt in response to a vehicle impact. The slider bar incorporates an internal piston which acts on the belt webbing position on the outside of the slider bar tube. Various embodiments are described incorporating alternate means of mounting the lap belt lower end to the slider bar, as well as various configurations for transferring the motion of the internal piston to the lap belt lower anchorage.

20 Claims, 7 Drawing Sheets

PYROTECHNIC LAP BELT PRETENSIONER WITH SLIDER BAR FUNCTION

FIELD OF THE INVENTION

This invention is related to an automotive seat belt restraint safety device and particularly to a pyrotechnic lap belt pretensioner which also functions as a slider bar for the lower anchorage end of a seat belt system lap belt.

BACKGROUND OF THE INVENTION

Seatbelt restraint systems for restraining an occupant in a vehicle seat play an important role in reducing occupant injury in vehicle crash situations. Seatbelt restraint systems of the conventional so-called "3-point" variety commonly have a lap belt section extending across the seat occupant's pelvis and a shoulder belt section crossing the upper torso, which are fastened together or are formed by a continuous length of seatbelt webbing. The lap and shoulder belt sections are connected to the vehicle structure by anchorages. A belt retractor is typically provided to store belt webbing and may further act to manage belt tension loads in a crash situation.

Seatbelt restraint systems which are manually deployed by the occupant (so-called "active" types) also typically include a buckle attached to the vehicle body structure by an anchorage. A latch plate attached to the belt webbing is received by the buckle to allow the belt system to be fastened for enabling restraint, and unfastened to allow entrance and egress from the vehicle. Seatbelt systems, when deployed, effectively restrain the occupant during a collision.

One type of pretensioning device is a pyrotechnic lap pretensioner (PLP). PLPs are attached to a webbing guide loop or a seatbelt anchorage. Typical PLPs having included a pyrotechnic charge that is fired when a collision occurs, producing expanding gas which pressurizes a gas chamber within a tube, which forces a piston down the tube. The piston is connected with the belt system by a cable or strap. Stroking of the piston tightens or "pretensions" the belt against the occupant.

In order to provide enhanced occupant ingress and egress in two-door style vehicles, the lower anchorage end of the lap belt portion of the seat belt can be attached to a slider bar. The slider bar is mounted to the vehicle floor pan at the rear outboard corners of the front occupant seats. The slider bar allows the lower anchorage end of the seat belt webbing that is normally anchored solidly to the vehicle floor pan or sill plate to slide backwards to allow ingress and egress to and from the rear seat area of the vehicle. When the front seat occupant dons the seat belt, the lower anchorage end of the seat belt slides forward and is solidly anchored at the front end of the slider bar. One drawback to this type of hardware is that it cannot be easily used in conjunction with a pyrotechnic lap pretensioner (PLP) being used today in the automotive industry.

Another design constraint in the design of PLP's is attributed to the fact that normally a piston sliding within the gas cylinder of the PLP includes a cable (or rod) which is pulled through the cylinder when the pyrotechnic charge is ignited. As the piston is moved along the tube, it pulls the cable through the gas cylinder of the PLP. A seal is required where the cable passes out of the gas cylinder where it is anchored to a belt system component. The presence of the cable in the gas cylinder results in a gas leakage path created where the cable passes through the gas chamber. This increases the complexity of the PLP and increases the gas production capacity required for the gas generator. It is a desirable design feature to eliminate the cable or other mechanism present within the gas cylinder of the PLP to thereby provide a completely sealed gas chamber.

SUMMARY OF THE INVENTION

In accordance with the present invention, a slider bar PLP is provided which provides the function of a slider bar used to enhance egress and ingress to and from the rear seat area of a two-door vehicle, and also acts as a PLP in the event of a vehicle impact. The PLP slider bar utilizes an internal piston driven under the influence of a micropyrotechnic gas generator to move within a sealed gas cylinder section of the bar tube. Such movement is transferred to the outside of the tube and engages the lap belt lower anchorage end. This movement draws the belt anchorage end in the rearward direction to exert pretensioning tightening of the lap belt. Various additional features of this device are disclosed including designs which engage the seat belt lower anchorage end in various manners, as well as clutch mechanisms to maintain the PLP and its desired rearward pretensioned position after firing of the gas generator.

Additional benefits and advantages of the present invention will become apparent to those skilled in the art to which the present invention relates from the subsequent description of the preferred embodiment and the appended claims, taken in conjunction with the accompanying drawings.

DETAILED DESCRIPTION OF THE INVENTION

Figure 1:
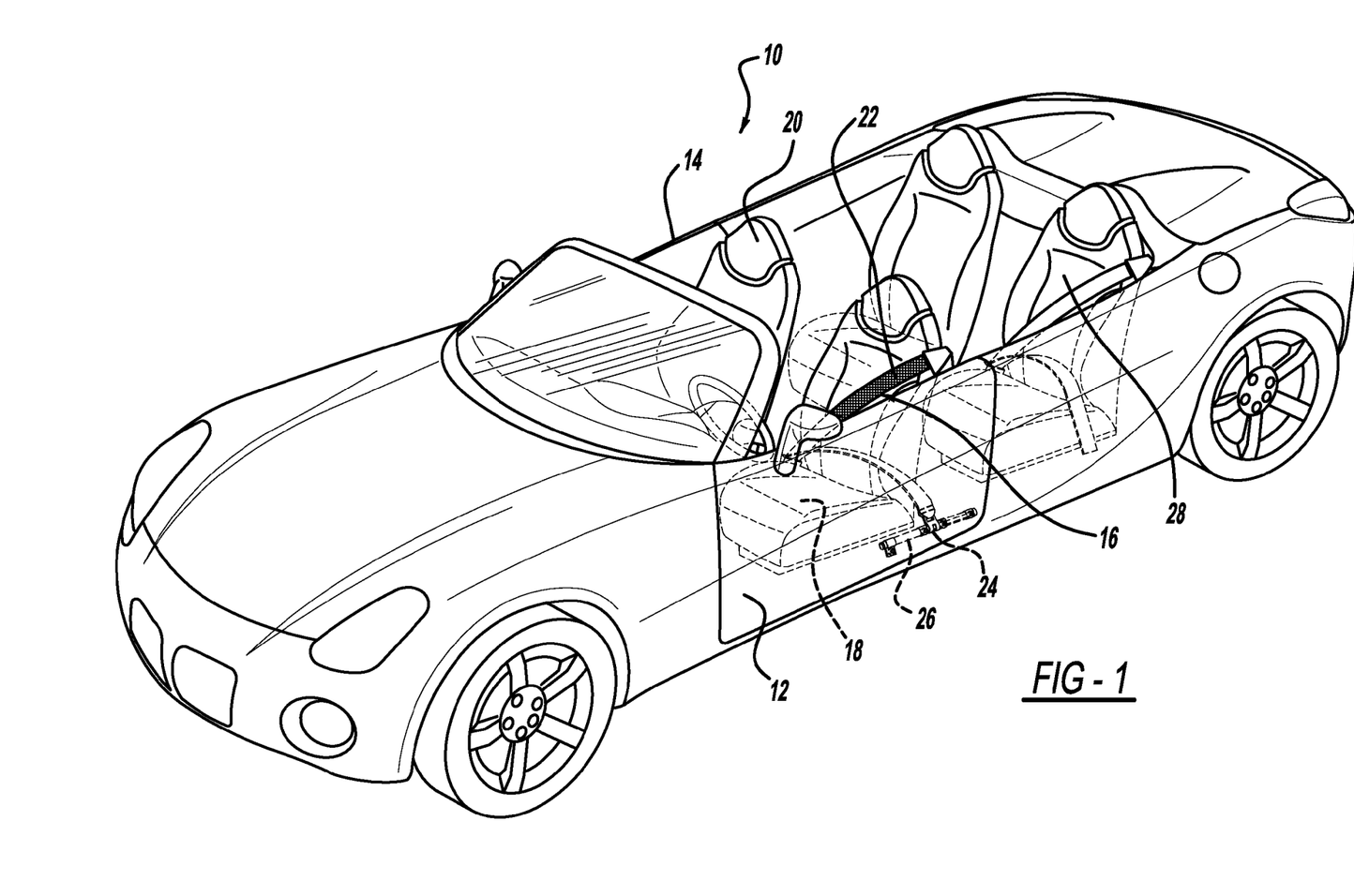
FIG. 1 is an isometric view of a representative two-door motor vehicle incorporating the PLP slider bar in accordance with the present invention.

FIG. 1 illustrates a representative motor vehicle 10 of the two-door variety which includes driver side doors 12, and passenger side doors 14. Seat belt system 16 is used to provide occupant restraint for an occupant in one of front seats 18 and 20. Seat belt system 16 includes an upper torso shoulder belt section 22 and a lap belt section 24 which extends across the pelvic area of the seat occupant. A buckle and attachment plate of conventional design (not shown) is used for attaching the lap and shoulder belt sections 22 and 24 at the inboard position of the front seats 18 and 20. In one popular configuration as shown, shoulder belt section 22 is anchored at its upper location directly to the seat backs of front seats 18 and 20.

The present invention utilizes a PLP slider bar 26 mechanism for allowing the lower anchorage end 30 of lap belt section 24 to be moved in the fore and aft direction to allow enhanced ingress and egress to and from the rear passenger compartment area 28. For that purpose, PLP slider bar 26 allows the lower anchorage end 30 of lap belt section 24 to freely move in the fore and aft direction. Donning of the seat belt by the vehicle occupant applies enough tension on lap belt section 24 to cause lower anchorage end 30 to move to its forward-most position. Although not shown in FIG. 1, an identical PLP slider bar 26 would be provided for the passenger side front seat 20. The PLP slider bar 26 in accordance with the present invention also provides a seat belt pretensioning function. In the event of a vehicle impact, PLP slider bar 26 is actuated to pull the lower anchorage end 30 of lap belt 24 in the rearward direction, thereby exerting pretensioning force on the lap belt. The details on the construction of various embodiments of PLP slider bars in accordance with this invention are illustrated in the remaining figures and discussed in the following description.

Figure 2:
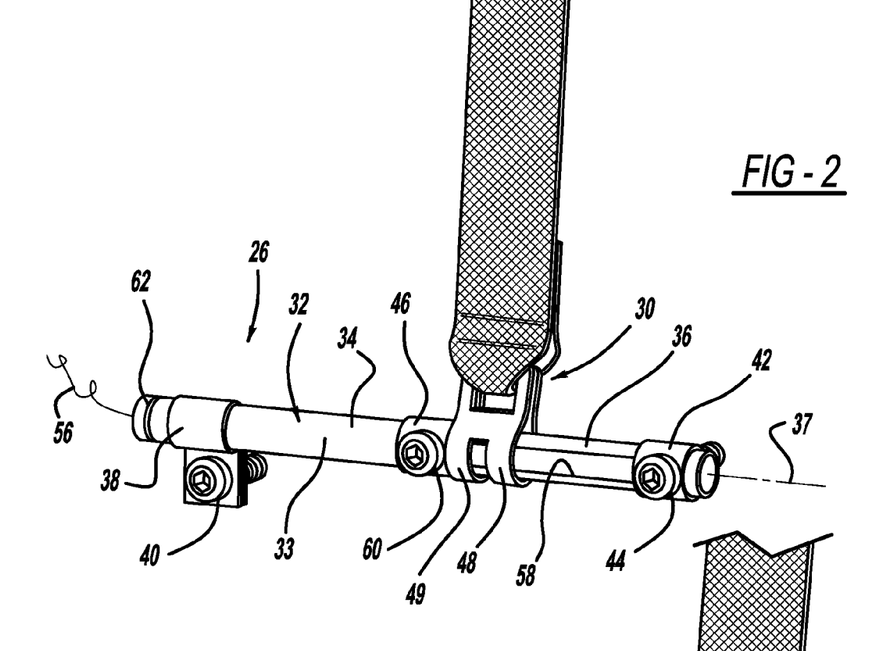
FIG. 2 is pictorial view of the PLP slider bar in accordance with a first embodiment of the invention shown with seat belt webbing attached in a normal non-deployed condition.
Figure 3:
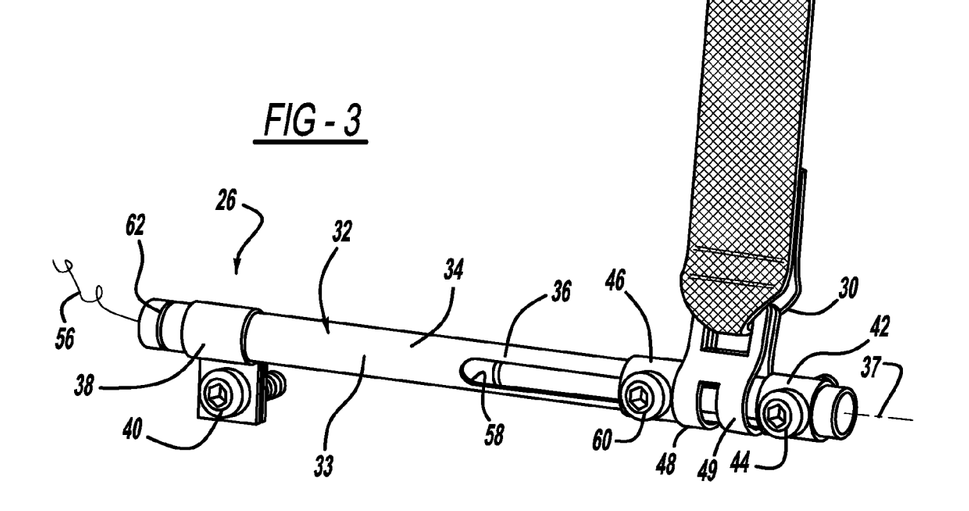
FIG. 3 shows the PLP slider bar of FIG. 2 shown in a pretensioning deployed condition.
Figure 4:
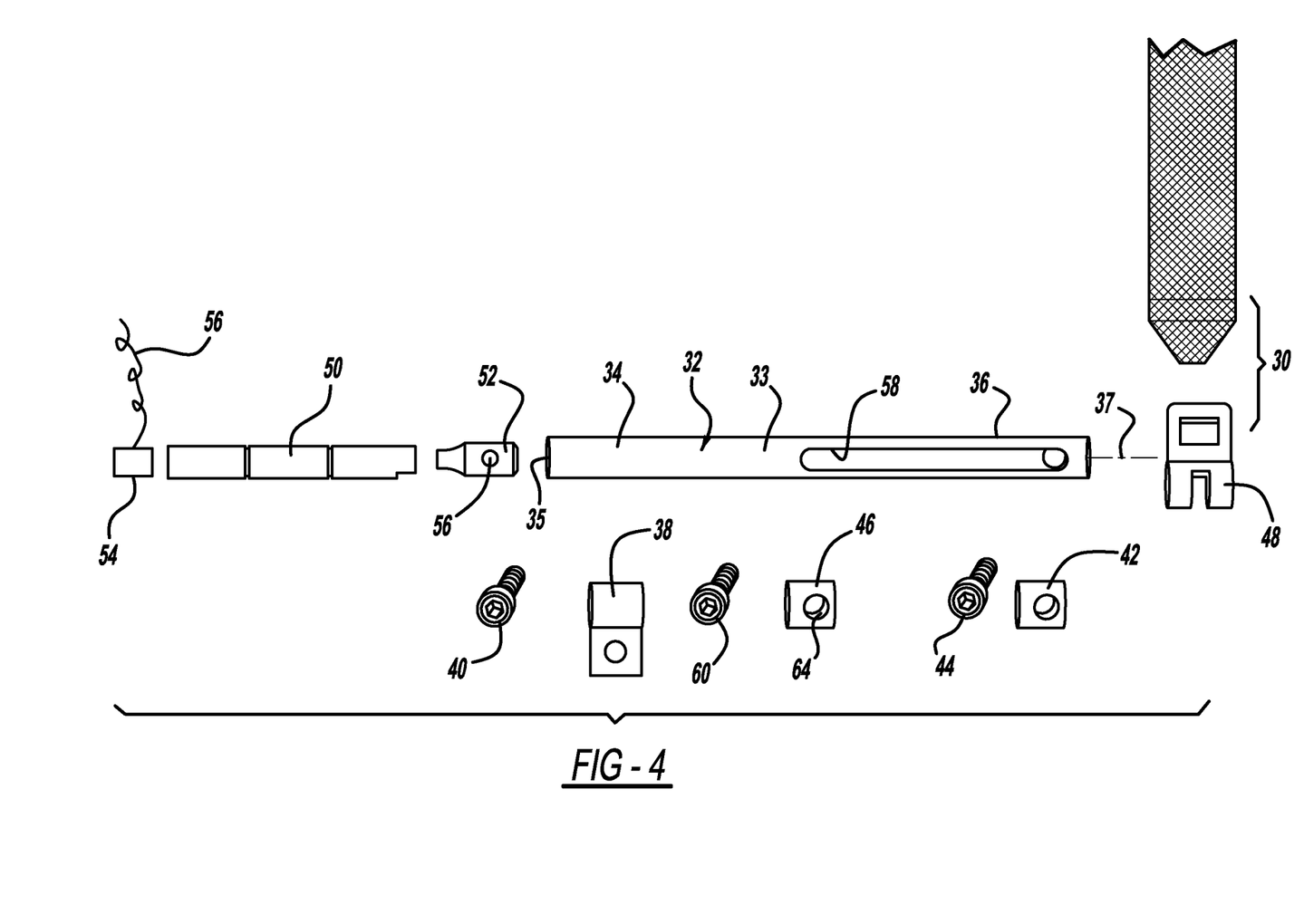
FIG. 4 is an exploded view of the PLP slider bar shown in FIGS. 2 and 3.

A first embodiment of a PLP slider bar 26 in accordance with this invention is illustrated in FIGS. 2 through 4. PLP slider bar 26 includes main tube 32 extending along longitudinal axis 37 and is a hollow cylinder with an external surface 33 and a hollow interior 35. Tube 32 has two sections, including a closed gas cylinder section 34 extending from a first end of the tube, and a webbing sliding section 36 extending to an opposite second end. One or more attachment clips 38 are provided for attachment of main tube 32 to a structural component of the motor vehicle. As shown, attachment clip 38 includes a bolt-type fastener 40. Collar 42, at the opposite second end of main tube 32, also provides a means for mounting PLP slider bar to the motor vehicle using another bolt-type fastener 44. Sliding collar 46 is moveable along exterior surface 33 of main tube webbing sliding section 36 in a manner which will be described in more detail as follows. The lower anchorage end 30 of lap belt section 24 is affixed to slider 49 which forms a sliding webbing anchor 48. In normal use of PLP slider bar 26 when it is in the normal condition shown in FIG. 1, slider 49 is freely able to slide between positions adjacent to sliding collar 46 and fixed collar 42. As described previously, this is desirable for facilitating ingress and egress for occupants of rear passenger compartment 28.

Internal components of PLP slider bar 26 are illustrated in FIG. 4. Internally positioned within gas cylinder section 34 is an elongated first piston section 50 which may be formed of a plastic material which butts against second piston section 52, preferably made of metal. Micropryotechnic gas generator 54 is positioned at the end of gas cylinder section 34 and is fixed and sealed in position, for example by rolling a shoulder 62 around tube 32. Firing line 56 provides electrical impulses to activate gas generator 54 when it is desired to provide the pretensioning function.

In a normal operating condition, first and second piston sections 50 and 52 are positioned in gas cylinder section 34 such that the bore 56 through the second piston section is positioned at the left-hand end of tube slot 58. In that position, fastener 60 passing through sliding collar bore 64 and into piston bore 56 is positioned against the left-hand end of tube slot 58. Slider 49 is designed to be freely movable along webbing sliding section 36 as mentioned previously, and acts as a sliding webbing anchor 48 in this design.

When it is desired to engage pretensioning functions, mircopyrotechnic gas generator 54 is activated which generates gas in main tube gas cylinder section 34. Gas pressure causes first and second piston sections 50 and 52 to be forcibly moved in the right-hand direction, as the components are shown in FIGS. 2 through 4. This action drives sliding collar 46 in the right-hand direction until it reaches the pretensioning position shown in FIG. 3. Fixed collar 42 and its fastener 44 prevent sliding collar 46 from coming off the main tube 32. Piston section 50 is long enough to prevent gas from gas generator 54 from escaping through slot 58 when the pretensioning operation occurs. This motion provides a rearward pretensioning retraction of the lap belt webbing section 24 for enhancing occupant restraint. PLP slider bar 26 provides a fully enclosed gas cylinder section within which the pistons 50 and 52 move which does not require a seal for a cable or other element which passes through the gas chamber.

In many designs of PLP slider bar 26, it would be desirable to incorporate a clutch mechanism to prevent sliding collar 46 from returning to its pre-deployment normal condition shown in FIG. 2 after firing of gas generator 54. Such a clutch mechanism can be provided by the design of first or second piston section 50 and 52 which could include barbs or ramped surfaces to prevent back-driving after actuation. Ball ramp-type clutch mechanisms, as described below, can also be provided for piston section 52.

It should be noted that it is not necessary for tube slot 58 to be formed through both sides of tube webbing sliding section 36. Bolt fastener 60 can enter into a blind threaded bore 56 in piston section 52, or it could pass completely through the piston to the opposite side of main tube 32, passing through an aligned hole in sliding collar 46. However, it may be more efficient to provide only a single tube slot 58 in the main tube 32.

Various approaches toward allowing sliding webbing anchor 48 of lap belt lower anchorage end 30 to freely side along webbing sliding section 36 can be provided. For example, as an alternative to using slider 49, the webbing end 30 could simply be sewn into a loop and directly wrapped around webbing sliding section 36. Such an approach could be implemented with a plastic or metal collar which may provide a bearing surface to allow free sliding motion of the webbing end.

Figure 5:
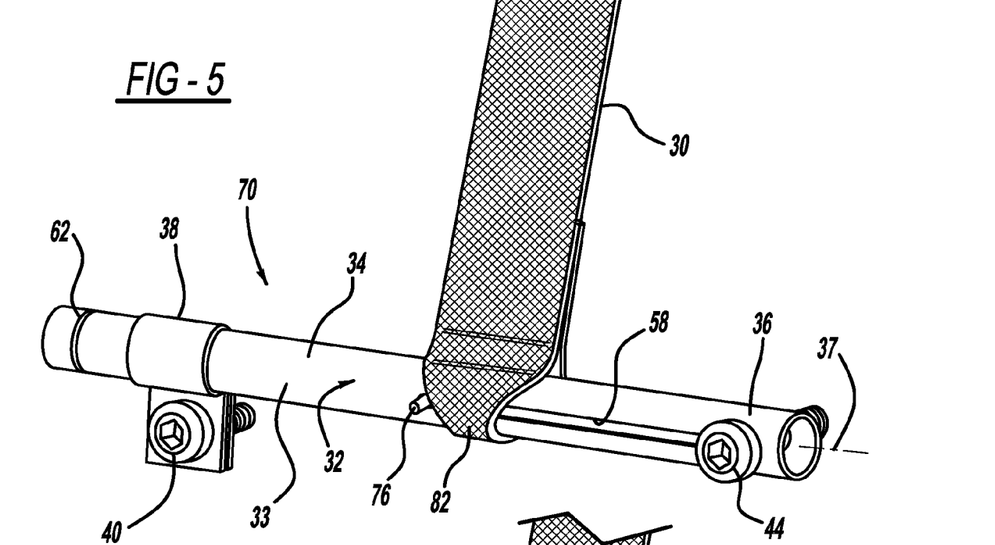
FIG. 5 is an elevational view of a PLP slider bar in accordance with the second embodiment of this invention utilizing a winged driver element for engaging the webbing loop forming the sliding webbing anchor.
Figure 6:
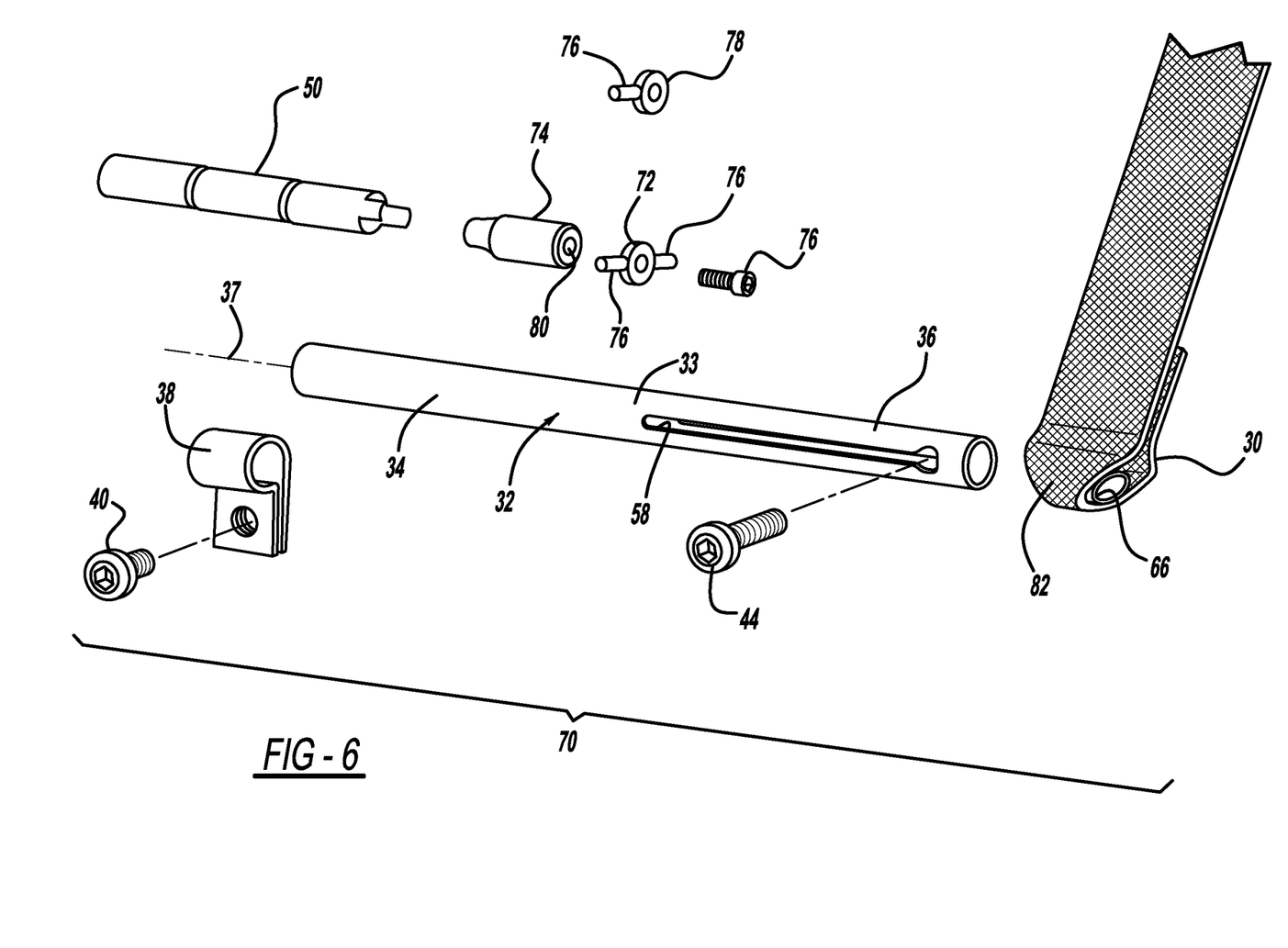
FIG. 6 is an exploded pictorial view of the PLP slider bar shown in FIG. 5.

FIGS. 5 and 6 illustrate PLP slider bar 70 in accordance with a second embodiment of this invention. Slider bar 70 has some components identical to that of the first embodiment which are identified by like reference numbers. This embodiment of slider bar 70 differs from slider bar 26 in several ways. First, sliding webbing anchor 48 for anchorage end 30 of the lap belt is formed by directly wrapping the webbing around webbing sliding section 36 into loop 82, as suggested previously. This design avoids the use of a separate slider 49 component. As mentioned previously, the lower loop 82 can be reinforced or provided with an internal collar 66 fitted between the webbing and the outer diameter of tube 32, and can be added to enhance the ease of sliding motion and avoid rattle problems. In this embodiment, a winged driver 72 is affixed to second piston section 74 by a screw fastener 76 installed into threaded bore 80. Winged driver 72 has a pair of winged projections 76 which extend out of a pair of diametrically opposed tube slots 58. Winged projections 76 extend through tube slot 58 far enough to directly engage with lap belt loop 82 to drive it in the manner described in the first embodiment from the left-hand edge of tube slots 58 toward the right-hand end of the tube slots.

A further embodiment of slider bar 70 incorporates winged driver 78 having a single winged projection 76. Such a design would preferably be used with a main tube 32 featuring a single tube slot 58, but would otherwise operate in a manner identical to the prior embodiment in that projection 76 would directly engage lap belt loop 82 to drive it a previously described. PLP slider bar 70 does not use fixed collar 42. Instead, bolt 44 is installed directly through tube 32.

Figure 7:
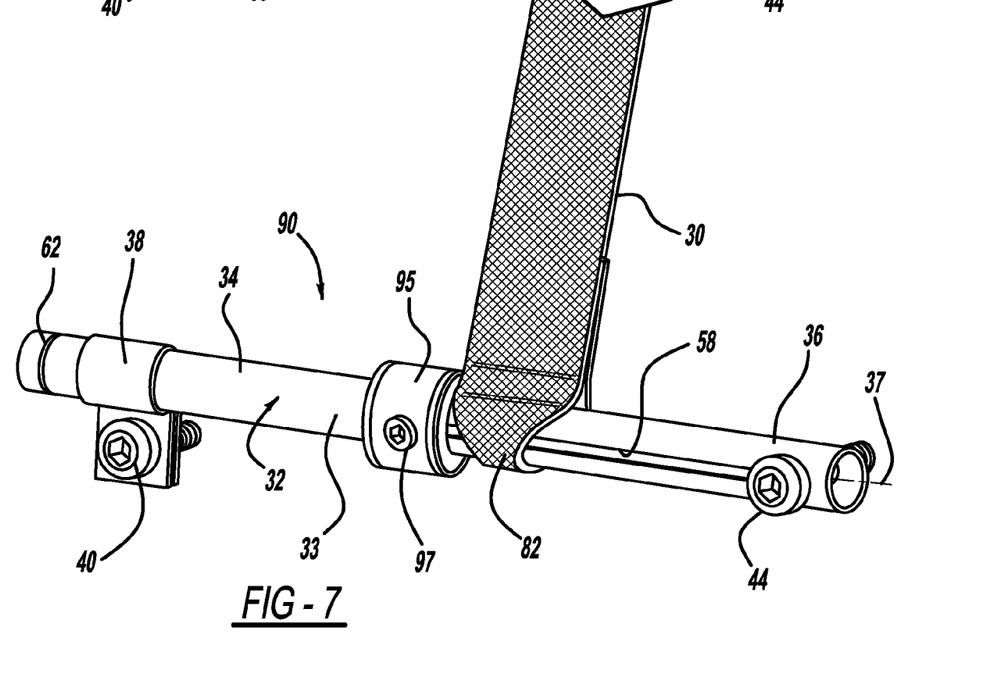
FIG. 7 is a pictorial view of a PLP slider bar in accordance with a third embodiment of this invention.
Figure 8:
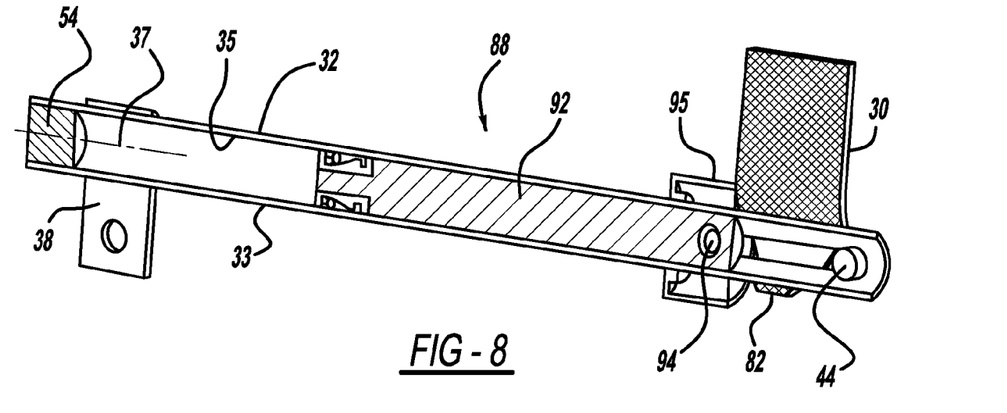
FIG. 8 is a longitudinal sectional view of a PLP slider bar shown in FIG. 7.
Figure 9:
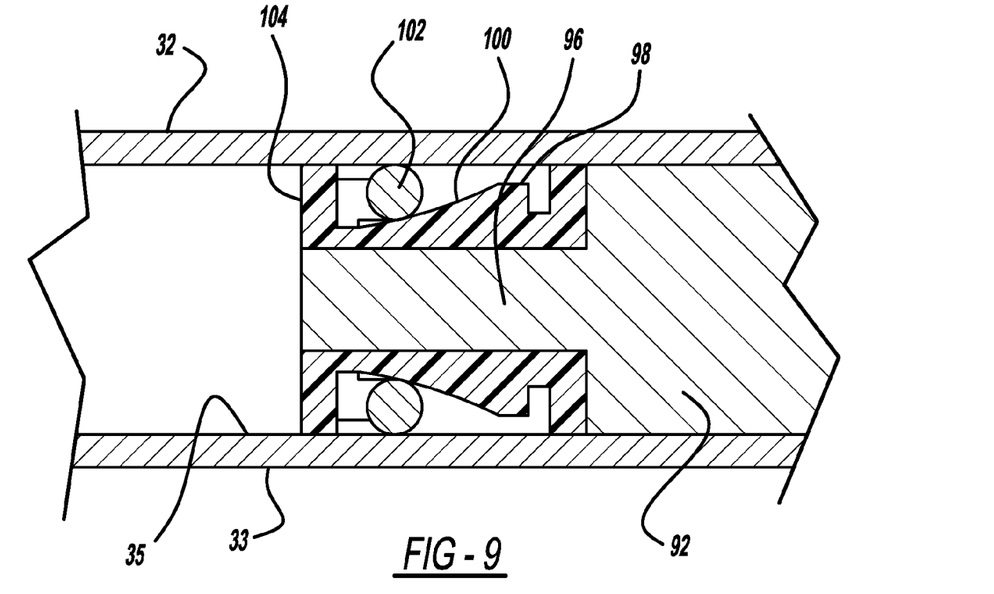
FIG. 9 is an enlarged cross-sectional view of the internal clutch mechanism of the PLP shown in FIG. 8.

FIGS. 7, 8, and 9 illustrate a PLP slider bar 90 in accordance with a further alternate embodiment of the present invention which includes elements previously described which are identified by like reference numbers. PLP slider bar 90 differs from the prior embodiments in that it utilizes an internal ball-ramp type clutch mechanism associated with the piston to prevent back-driving of the piston after actuation. In this embodiment, piston 92 is shown as a single element as opposed to the prior embodiments which incorporated a sectioned piston. Piston 92 includes a cross bore 94 which allows attachment of sliding collar 95 using attachment bolt 97. The end of piston 92 closest to gas generator 54 has a projecting post 96 with collar 98 installed over it. Collar 98 includes an external ramp or conical ramp surface 100 which interacts with a series of metal balls 102. Flange 104 of collar 98 traps balls 102 to move along the conical surface.

When PLP slider bar 90 is actuated by firing gas generator 54, piston 92 is driven in the right-hand direction to provide the pretensioning motion previously described. In this motion, balls 92 tend to move, due to frictional interaction of the inside of tube 32, to the left-hand position along ramp surface 100. If a force acts on piston 92 urging it to move in the left-hand direction after actuation, however, balls 102 become jammed between the conical surface 100 and the inside surface of tube 32, thus acting as a one-way ball-ramp type clutch to prevent back-driving of the piston. FIG. 8 illustrates PLP slider bar 88 in an activated extended position which provides pretensioning motion.

Figure 10:
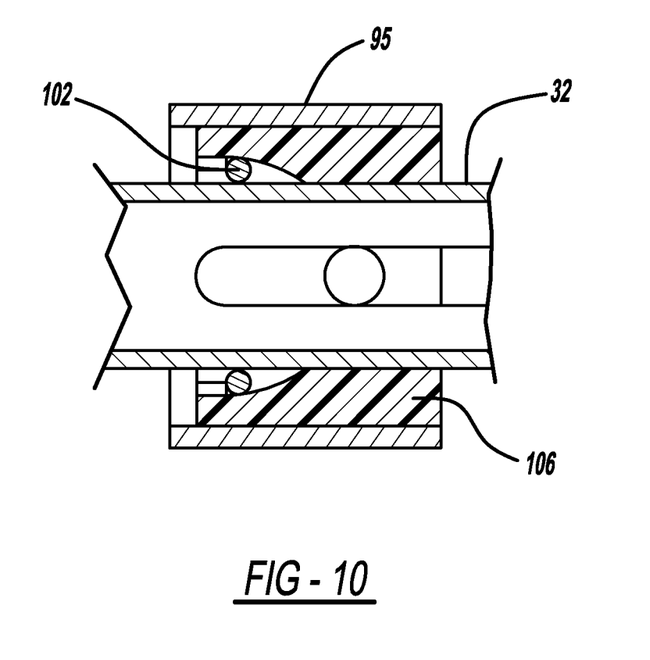
FIG. 10 is a partial cross-section view of the PLP slider bar of FIG. 9 having an alternate design of a one-way ball-ramp clutch.

FIG. 10 illustrates PLP slider bar 70 having a modified form of a back-driving prevention clutch of the ball-ramp variety. Rather than having an internal clutch, collar 95 uses ball elements 102 engaging the exterior surface 33 of tube 32. Collar 95 has an internal bushing 106 forming conical surface 108 which cooperates with the balls to prevent back-driving of collar 95 once it is stroked to the pretensioning position.

While the above description constitutes the preferred embodiment of the present invention, it will be appreciated that the invention is susceptible to modification, variation, and change without departing from the proper scope and fair meaning of the accompanying claims.

The invention claimed is:

1. A seat belt pretensioner slider bar for permitting a lower anchorage end of a seat belt webbing lap belt section of a seat belt system for a motor vehicle to be slid in a longitudinal direction in a normal operating condition and further for applying pretensioning retraction to the lower anchorage end in a pretensioning condition, comprising:
    an elongated tube having an exterior cylindrical surface and a hollow interior defining a longitudinal axis having a gas cylinder section extending from a first end of the tube and a webbing sliding section extending from the gas cylinder section to an opposite second end, the webbing sliding section forming a slot extending in the longitudinal direction,
    an attachment for mounting the tube to a structural component of the motor vehicle,
    a piston movable within the gas cylinder section of the tube between a normal position adjacent the first end of the tube to a pretensioning position toward the second end,
    a gas generator for generating gas within the tube gas cylinder section for urging the piston to move from the normal to the pretensioning position,
    a sliding webbing anchor engageable with the lower anchorage end and slidable along the exterior cylindrical surface of the tube along the webbing sliding section to a variety of positions relative to the piston when the piston is in the normal position, the sliding webbing anchor being configured to jointly move both the lower anchorage end and the webbing lap belt section in the longitudinal direction away from the first end while the webbing anchor slides away from the first end along the webbing sliding section and toward the first end while the webbing anchor slides toward the first end along the webbing sliding section, and
    a webbing driver connected to the piston through the tube slot and engaging the webbing anchor when the piston is moved to the pretensioning position for moving the webbing anchor to a position adjacent the second tube end thereby providing the pretensioning retraction to the webbing anchor and the webbing.

2. The seat belt pretensioner according to claim 1 further comprising the sliding webbing anchor in the form of a slider element wrapped around the tube and attached to the lower anchorage end.

3. The seat belt pretensioner according to claim 1 further comprising the webbing driver in the form of a projection affixed to the piston and extending through the slot to engage the webbing anchor.

4. The seat belt pretensioner according to claim 1 further comprising the webbing driver in the form of a pair of projections affixed to the piston and extending through a pair of the slots formed at diametrically opposed positions in the tube to engage the webbing anchor.

5. The seat belt pretensioner according to claim 1 further comprising the piston being segmented in a first and second section.

6. The seat belt pretensioner according to claim 1 wherein the slider bar is further adapted to be installed in a 2-door vehicle and in the normal condition sliding of the lower anchorage is provided to enhance ingress and egress for rear seat passengers of the motor vehicle.

7. The seat belt pretensioner according to claim 1 wherein the piston is confined within the gas cylinder section which is closed between the normal and the pretensioning positions.

8. The seat belt pretensioner according to claim 1 further comprising at least one attachment clip at at least one of the first tube end and the second tube end for enabling the tube to be mounted to the vehicle.

9. The seat belt pretensioner according to claim 8 further comprising the attachment clip wrapping around the exterior cylindrical surface of the tube.

10. The seat belt pretensioner according to claim 1 further comprising the webbing driver in the form of an annular sliding collar positioned around the tube and engaging the piston by a fastener extending through the tube slot.

11. The seat belt pretensioner according to claim 10 further comprising the tube forming a pair of the slots at diametrically opposed positions and the fastener passing through the pair of slots.

12. The seat belt pretensioner according to claim 1 further comprising a clutch to prevent the sliding webbing anchor from moving back to the normal position from the pretensioning position.

13. The seat belt pretensioner according to claim 12 further comprising the clutch in the form of a ball-ramp assembly engaging an inside surface of the tube.

14. The seat belt pretensioner according to claim 12 further comprising the clutch in the form of a ball-ramp assembly engaging the exterior cylindrical surface of the tube.

15. A seat belt pretensioner slider bar for permitting a lower anchorage end of a seat belt webbing lap belt section of a seat belt system for a motor vehicle to be slid in a longitudinal direction in a normal operating condition and further for applying pretensioning retraction to the lower anchorage end in a pretensioning condition, comprising:

an elongated tube having an exterior cylindrical surface and a hollow interior defining a longitudinal axis having a gas cylinder section extending from a first end of the tube and a webbing sliding section extending from the gas cylinder section to an opposite second end, the webbing sliding section forming a slot extending in the longitudinal direction, an attachment for mounting the tube to a structural component of the motor vehicle, a piston movable within the gas cylinder section of the tube between a normal position adjacent the first end of the tube to a pretensioning position toward the second end, a gas generator for generating gas within the tube gas cylinder section for urging the piston to move from the normal to the pretensioning position, a sliding webbing anchor in the form of a loop of webbing at the lower anchorage end, the tube extending through the loop, the sliding webbing anchor being slidable along the webbing sliding section to a variety of positions relative to the piston when the piston is in the normal position, and a webbing driver connected to the piston through the tube slot and engaging the webbing anchor when the piston is moved to the pretensioning position for moving the webbing anchor to a position adjacent the second tube end thereby providing the pretensioning retraction to the webbing anchor and the webbing.

16. The seat belt pretensioner according to claim 15 further comprising the webbing driver in the form of an annular sliding collar positioned around the tube and engaging the piston by a fastener extending through the tube slot.

17. The seat belt pretensioner according to claim 15 further comprising the webbing driver in the form of a projection affixed to the piston and extending through the slot to engage the webbing anchor.

18. The seat belt pretensioner according to claim 15 further comprising the webbing driver in the form of a pair of projections affixed to the piston and extending through a pair of the slots formed at diametrically opposed positions in the tube to engage the webbing anchor.

19. The seat belt pretensioner according to claim 15 further comprising a clutch to prevent the sliding webbing anchor from moving back to the normal position from the pretensioning position.

20. A seat belt pretensioner slider bar for permitting a lower anchorage end of a seat belt webbing lap belt section of a seat belt system for a motor vehicle to be slid in a longitudinal direction in a normal operating condition and further for applying pretensioning retraction to the lower anchorage end in a pretensioning condition, comprising:

an elongated tube having an exterior cylindrical surface and a hollow interior defining a longitudinal axis having a gas cylinder section extending from a first end of the tube and a webbing sliding section extending from the gas cylinder section to an opposite second end, the webbing sliding section forming a slot extending in the longitudinal direction, an attachment for mounting the tube to a structural component of the motor vehicle, a piston movable within the gas cylinder section of the tube between a normal position adjacent the first end of the tube to a pretensioning position toward the second end, a gas generator for generating gas within the tube gas cylinder section for urging the piston to move from the normal to the pretensioning position, a sliding metal webbing anchor engageable with the lower anchorage end and slidable along the exterior cylindrical surface of the tube along the webbing sliding section to a variety of positions relative to the piston when the piston is in the normal position, and a webbing driver connected to the piston through the tube slot and engaging the webbing anchor when the piston is moved to the pretensioning position for moving the webbing anchor to a position adjacent the second tube end thereby providing the pretensioning retraction to the webbing anchor and the webbing.

\* \* \* \* \*